United States Patent
Yarmchuk (10) Patent No.: US 6,654,196 B2
(45) Date of Patent: Nov. 25, 2003

(54) AVOIDING WRITE TO READ INTERFERENCE DURING SELF-SERVOWRITING

(75) Inventor: Edward J. Yarmchuk, Mahopac, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 449 days.

(21) Appl. No.: 09/812,751

(22) Filed: Mar. 20, 2001

(65) Prior Publication Data

US 2002/0135925 A1 Sep. 26, 2002

(51) Int. Cl.$^7$ ............................................... G11B 21/02
(52) U.S. Cl. ....................................................... 360/75
(58) Field of Search .................... 360/75, 48, 77.08, 360/51, 53, 60, 66, 62

(56) References Cited

U.S. PATENT DOCUMENTS

| | | | |
|---|---|---|---|
| 5,659,436 A | 8/1997 | Yarmchuk et al. | 360/75 |
| 5,757,574 A | 5/1998 | Chainer et al. | 360/75 |
| 5,844,742 A | 12/1998 | Yarmchuk et al. | 360/75 |
| 6,078,450 A | 6/2000 | Chainer et al. | 360/51 |
| 6,469,859 B1 * | 10/2002 | Chainer et al. | 360/75 |

* cited by examiner

Primary Examiner—David Hudspeth
Assistant Examiner—K. Wong
(74) Attorney, Agent, or Firm—Heslin & Rothenberg, P.C.

(57) ABSTRACT

During self-servowriting, burst information is written within slots defined on tracks of a recording medium. In writing the burst information, write to read interference, caused by large offsets in separate read and write elements of a recording transducer, is to be avoided. In order to avoid the write to read interference, the slots are carefully chosen. The choice of a particular slot can be independent of any predefined order, such as a successive order. Further, the order in which slots are chosen may be altered during the propagation process.

98 Claims, 7 Drawing Sheets fig. 1 fig. 2 fig. 3 fig. 4

| BURST SLOT NUMBER | | | | | | | | R/W OFFSET | TRACK NO. |
|---|---|---|---|---|---|---|---|---|---|
| 0 | 1 | 2 | 3 | 4 | 5 | 6 | 7 | | |
| $A_0$ | $B_1$ | $C_2$ | | | | | w | 6.49 | 7 |
| w | $A_1$ | $B_2$ | $C_3$ | | | | | 6.49 | 8 |
| | $A_1$ | $B_2$ | $C_3$ | | w | | | 6.51 | 9 |
| | | $A_2$ | $B_3$ | $C_4$ | | w | | 6.51 | 10 |
| | | | $A_3$ | $B_4$ | $C_5$ | | w | 6.51 | 11 |
| w | | | | $A_4$ | $B_5$ | $C_6$ | | 6.51 | 12 |
| | w | | | | $A_5$ | $B_6$ | $C_7$ | 6.51 | 13 |
| $C_8$ | | w | | | | $A_6$ | $B_7$ | 6.51 | 14 |
| $B_8$ | | | w | | $C_9$ | | $A_7$ | 6.51 | 15 |
| $A_8$ | | | | w | $B_9$ | $C_{10}$ | | 6.51 | 16 |
| | w | | | | $A_9$ | $B_{10}$ | $C_{11}$ | 6.51 | 17 |
| $C_{12}$ | | w | | | | $A_{10}$ | $B_{11}$ | 6.51 | 18 |
| $B_{12}$ | $C_{13}$ | | w | | | | $A_{11}$ | 6.51 | 19 |
| $A_{12}$ | $B_{13}$ | $C_{14}$ | | w | | | | 6.51 | 20 |
| | $A_{13}$ | $B_{14}$ | $C_{15}$ | | w | | | 6.51 | 21 |
| | | $A_{14}$ | $B_{15}$ | $C_{16}$ | | w | | 6.51 | 22 |
| | $C_{17}$ | | $A_{15}$ | $B_{16}$ | | | w | 6.51 | 23 |
| w | $B_{17}$ | $C_{18}$ | | $A_{16}$ | | | | 6.51 | 24 |
| | $A_{17}$ | $B_{18}$ | $C_{19}$ | | w | | | 6.51 | 25 |

*fig. 5*

| #SLOTS | SPACING | INCREMENTS | EXCLUSIONS |
|---|---|---|---|
| 6 | 3 | 1, 1, 1, 1 | A,B,C |
| 7 | 3 | 1, 3, 1 | A,B,C |
| 7 | 3 | 1, 4 | A,B,C, SLOTS BEFORE A,B,C |
| 7 | 4 | 1, 1, 1, 1 | A,B,C |
| 8 | 3 | 1, 5 | A,B,C SLOTS BEFORE A,B,C |
| 8 | 3 | 1, 1, 1, 1, 1, 1 | A,B,C SLOTS BEFORE A,B,C |
| 8 | 4 | 1, 4 | A,B,C |
| 8 | 5 | 1, 1, 1, 1 | A,B,C |
| 9 | 5 | 1, 1, 1, 1, 1 | A,B,C SLOTS BEFORE A,B,C |
| 9 | 6 | 1, 1, 1, 1 | A,B,C |
| 9 | 3 | 1, 6 | A,B,C SLOTS BEFORE A,B,C +SLOTS 2 BEFORE A,B,C |

| INTEGER OFFSET | PATTERN LENGTH | SLOT PATTERN VECTOR |
|---|---|---|
| 5 | 8 | 01234567 |
| 6 | 36 | 456701270123452345670567012301234567 |
| 7 | 28 | 3456701567012370123451234567 |
| 8 | 50 | 23456703456701456701256701236701234701234501234567 |
| 9 | 64 | 1234567023456701345670124567012356701234670123457012345601234567 |
| 10 | 8 | 01234567 |
| 11 | 8 | 01234567 |
| 12 | 8 | 01234567 |
| 13 | 8 | 01234567 |
| 14 | 76 | 4567012345670127012345670123452345670123456705670123456701230123456701234567 |
| 15 | 60 | 345670123456701567012345670123701234567012345123456701234567 |
| 16 | 106 | 2345670123456703456701234567014567012345670125670123456701236701234567012347012345670123450123456701234567 |
| 17 | 128 | 12345670123456702345670123456701345670123456701245670123456701235670123456701234670123456701234570123456701234560123456701234567 |
| 18 | 8 | 01234567 |
| 19 | 8 | 01234567 |
| 20 | 8 | 01234567 |
| 21 | 8 | 01234567 |
| 22 | 116 | 4567012345670123456701270123456701234567012345234567012345670123456705670123456701234567012301234567012345670123456701234567 |

*fig. 8*

AVOIDING WRITE TO READ INTERFERENCE DURING SELF-SERVOWRITING

TECHNICAL FIELD

This invention relates, in general, to the writing of servopatterns on recording media using self-propagation, and in particular, to avoiding write to read interference during the self-servowriting.

BACKGROUND ART

Self-servowriting is an attractive mechanism for producing servopatterns on recording media, such as disk files, because it eliminates the need for costly positioning systems and can be performed outside of a clean room environment. Processes for self-propagation of both radial and timing patterns have been developed recently. For example, in U.S. Pat. No. 5,659,436, entitled "Radial Self-Propagation Pattern Generation for Disk File Servowriting", issued Aug. 19, 1997, which is hereby incorporated herein by reference in its entirety, a capability is described for deriving a servo position signal that is used to control the location of the head while writing tracks. In this example, the servo position signal is derived from the readback amplitude of a single track written one step earlier.

In modern disk files, however, the read element of the head can be offset from the write element of the head by as much as several tracks. When the read to write offset gets large, it is desirable to use a combination of readback amplitudes from several tracks to provide the position signal for the servo. This is described in, for example, U.S. Pat. No. 5,757,574, entitled "Methods and Systems for Self-Servowriting Including Maintaining a Reference Level Within a Usable Dynamic Range", issued May 26, 1998, and commonly assigned, U.S. patent application Ser. No. 09/583,832, entitled "Techniques for Multitrack Positioning and Controlling Error Growth in Self-Servowriting Systems", filed May 31, 2000, (herein referred to as the Multitrack Application), both of which are hereby incorporated herein by reference in their entirety.

The servo position signal is used during the radial propagation process to control the head in order to write burst information in time slots within the disk. Typically, the disk is partitioned into a number of sectors, and each sector includes a small number of time slots that are dedicated to the radial propagation process. Within a revolution of the disk, burst information is written in one of the slots in each sector of a track. The slots are cycled through, with a given slot reused after a number of steps equal to the number of slots. If the number of slots is not large enough, a track being written will coincide with one of the slots being read. Electrical interference from writing will alter the readback signal which will disturb the servo positioning and cause an error in the position of the written track.

A further complication arises from the fact that the read to write offset generally varies with radial position due to the arc motion of the actuator and the difference in pivot to head distances of the read and write elements. In modern files, the offset can change by as much as five data cylinders or more in moving from the inner diameter (ID) to the outer diameter (OD) of the disk, and even larger variations are expected for future designs.

Thus, a need exists for a capability that avoids write to read interference with large offset heads. A further need exists for a capability that avoids interference for an offset that increases across the disk.

SUMMARY OF THE INVENTION

The shortcomings of the prior art are overcome and additional advantages are provided through the provision of a method of writing burst information on a recording medium having a plurality of tracks. The method includes, for instance, writing burst information within a plurality of slots of a first portion of tracks of the plurality of tracks, wherein the plurality of slots are chosen in a predefined order; and writing burst information within the plurality of slots of another portion of tracks of the plurality of tracks, wherein the plurality of slots are chosen using an order different than the predefined order.

In a further aspect of the present invention, a method of writing burst information on a recording medium having a plurality of tracks is provided. The method includes, for instance, selecting a slot on a track of the plurality of tracks to receive burst information, the selecting being unconcerned with a particular order for selecting slots; and writing burst information within the selected slot.

In yet a further aspect of the present invention, a method of writing burst information on a recording medium having a plurality of tracks is provided. The method includes, for instance, writing burst information within one or more slots of one or more tracks of the plurality of tracks; determining that if burst information is to be written in a slot of another track of the plurality of tracks that a write to read interference will occur; and selecting, in response to the determining, another slot of the another track to write the burst information.

In another aspect of the present invention, a method of writing burst information on a recording medium having a plurality of tracks is provided. The method includes, for instance, writing burst information within one slot of a track of the plurality of tracks; and writing burst information within another slot of a next track of the plurality of tracks, wherein the another slot is not in successive order of the one slot.

System and computer program products corresponding to the above-summarized methods are also described and claimed herein.

Advantageously, one or more capabilities of the present invention provide for varying the order in which slots are selected to receive burst information. This enables write to read interference, due to, for example, large offset heads, to be avoided. Further, it enables the write to read interference to be avoided using a small number of radial time slots. Yet further, one aspect of the present invention enables the avoidance of an interference for an offset that increases across the recording medium.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, it has been determined that a problem occurs with widely offset heads. For example, it has been determined that a write to read interference occurs at particular point in time during the self-servowrite process, when the read and write elements are very far apart. Thus, in one aspect of the present invention, a capability is provided to avoid the write to read interference. As one example, this capability includes varying the order in which the slots receive burst information.

Figure 1:
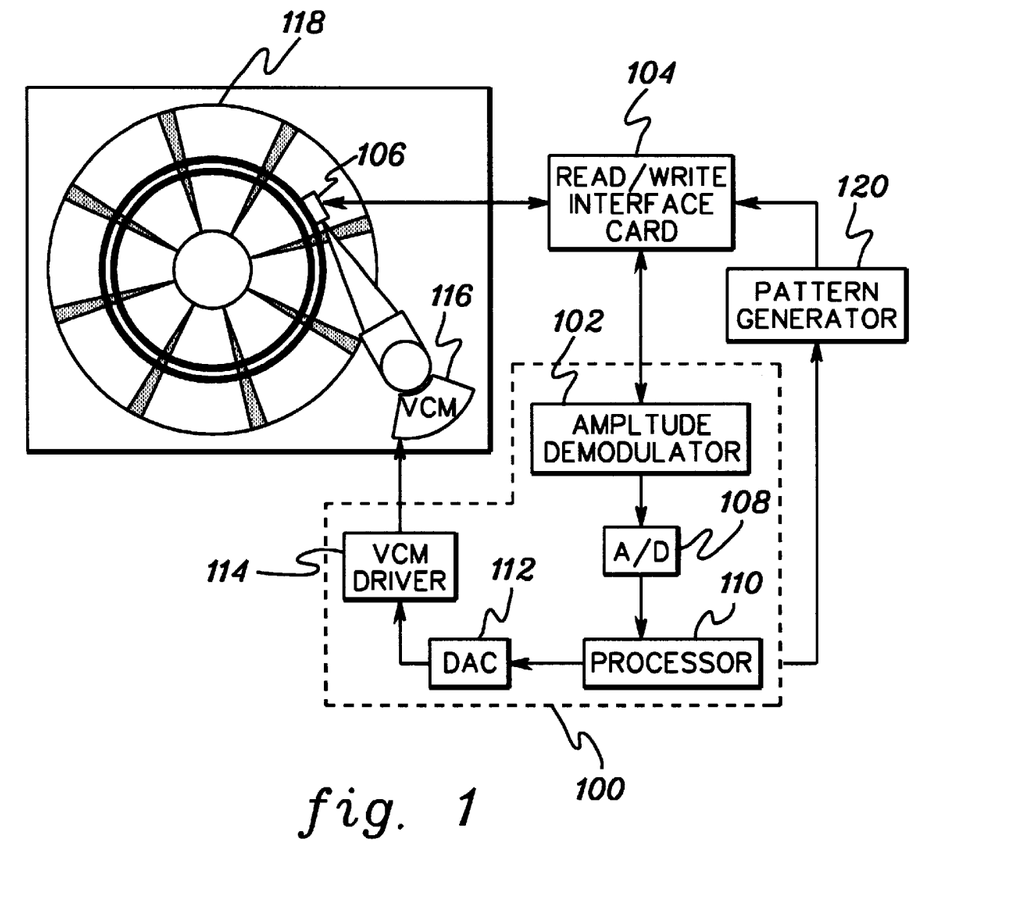
FIG. 1 depicts one example of a recording medium and associated electronics for self-servowriting, in accordance with an aspect of the present invention.

One embodiment of various elements used for radial self-propagation and servopattern writing is described with reference to FIG. 1. In one example, a radial propagation controller 100 includes an amplitude demodulator 102, which receives as input readback signals from a read/write interface card 104. The read/write interface card receives the signals from recording transducer 106 (e.g., a recording head).

The amplitude demodulator converts the readback signals to a position signal, which is input to an analog to digital (A/D) converter 108. The converter converts the signal to digital and passes the signal to a processor 110 (e.g., a digital processor, such as a TMS 320 offered by Texas Instruments).

The processor calculates an error in the present head position from the desired position and outputs a correction value to a digital to analog converter (DAC) 112. DAC 112 converts the correction value into an analog signal, which is input to a voice coil motor (VCM) driver 114. The VCM driver converts the analog voltage signal into a current, which drives a voice coil motor 116 (VCM). The voice coil motor, in turn, moves transducer (or head) 106 approximately radially across a recording medium 118.

Further, the processor controls a pattern generator 120 that write patterns of magnetic transitions on selected regions of recording medium 118. Additional details regarding the elements used for radial self-propagation are described in U.S. Pat. No. 6,078,450, entitled "Method And Apparatus For Correcting For Random Errors in Timing Pattern Generation", issued Jun. 20, 2000, which is hereby incorporated herein by reference in its entirety.

Figure 2:
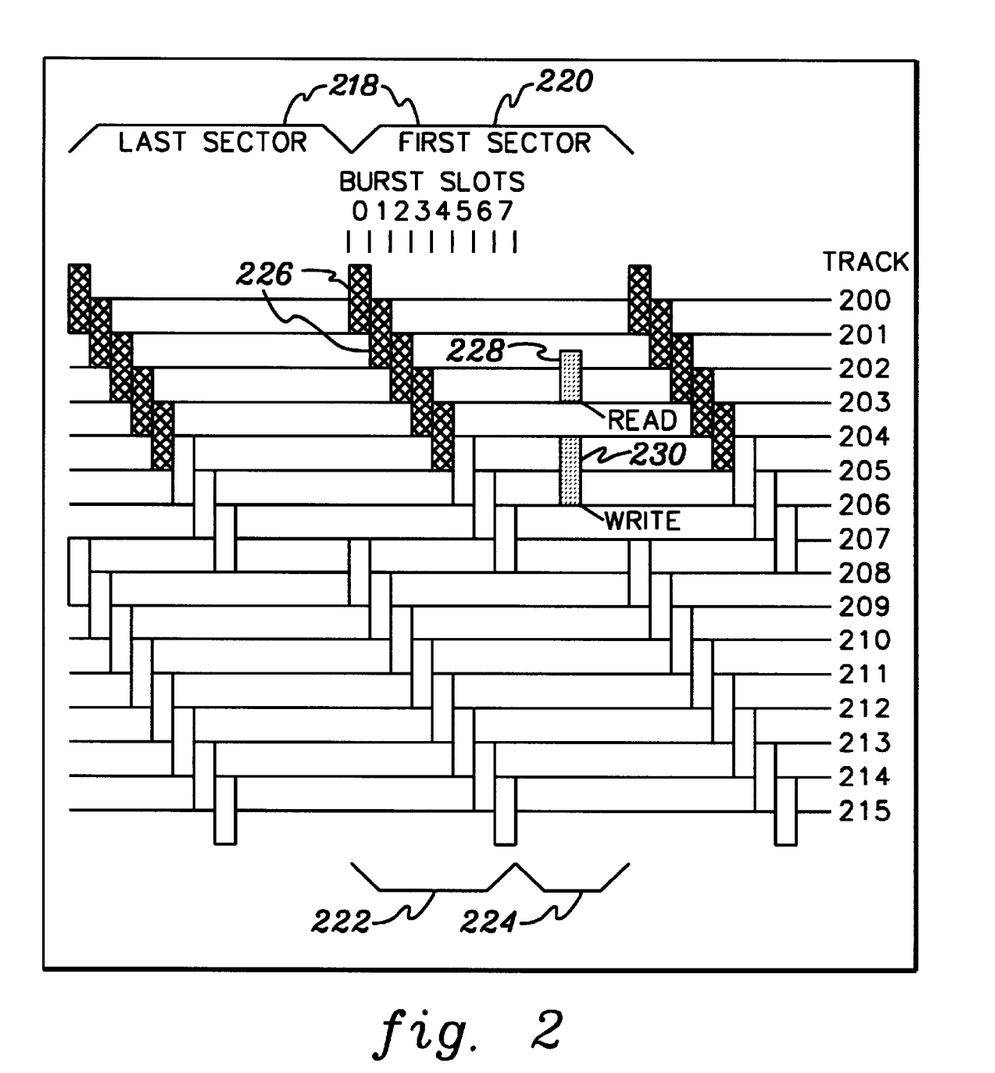
FIG. 2 depicts one embodiment of a partial layout of various sectors of the recording medium of FIG. 1 in the propagation of burst information, in accordance with an aspect of the present invention.

In one example, recording medium 118 is a disk, which is further described with reference to FIG. 2. In particular, FIG. 2 depicts a portion of the disk. As one example, the disk includes a number of propagation tracks 200, 201, 202, ... 215, etc., and each track is divided into a number of sectors 218. In one example, a first sector 220 comes immediately after the disk rotation index, as determined by an index pulse from the disk spindle motor driver.

Each sector 218 is further divided into a region 222 containing the amplitude bursts for propagation and a region 224, which is reserved for the use of the precision timing propagation system and for writing the actual product servopattern including sector ID fields and either amplitude burst or phase encoded patterns. In one example, propagation burst areas 222 will be overwritten with user data following servowriting. Further, region 224, except for the part containing the product servopattern, will also be overwritten with user data.

Each propagation burst region 222 is further divided into a number of burst slots 226 within which the amplitude burst information (e.g., patterns) for propagation are written. In this example, 8 slots numbered 0–7 are shown.

Also shown in the figure are a read element 228 and a separate write element 230 that comprise the recording transducer. At this instance in time, the write element is positioned for writing on track 205, and due to the large offset, the read element straddles several previously written tracks. (Crosshatched bursts indicate bursts on tracks that have already been written.) With large offsets like this, several tracks are prepared in advance before a servo based on multiple tracks is employed. Various possible techniques for preparing this initial set of tracks exist. One such technique is described in U.S. patent application Ser. No. 09/584,302, entitled "Creating An Initial Set Of Tracks In A Self-Servowriting System Using A Compliant Crash Stop To Control Head Movement", filed May 31, 2000, which is hereby incorporated herein by reference in its entirety. For the present invention, it is assumed that a set of initial tracks is present.

At a servo track spacing of one half of the data cylinder spacing, the read element typically overlaps three (3) tracks at any time. In accordance with a technique described in the Multitrack Application referenced above, all three readback amplitudes are used to compute a servo position signal (PS) that represents an interpolated track number corresponding to the center of the read element. For the situation depicted in FIG. 2, the signals from tracks 201, 202 and 203 are used. More generally, the three tracks involved in readback are referred to as A, B, and C, where B is the track closest to the center of the read element, A is the track written one step before B, and C is the track written one step after B. In the figure, the read to write offset is approximately 2.7 steps and the next track to be written is track 205.

In order to write the next track, the servo is stepped forward. This is accomplished by changing the reference input to the servo. In particular, the controller acts to reduce a position error signal (PES), which is equal to the reference minus the PS, to zero by changing the VCM current. Adding 1.0 to the reference causes the servo to reposition the head so that the PS increases by the same amount. After settling at the new position, the next track is written.

By stepping forward by 1.0, the read to write offset remains constant in track number units. However, in some cases, especially with rotary actuators, the physical read to write offset distance increases as the actuator moves in an arc across the disk. To avoid large changes in absolute track spacing, the point at which writing takes place is to be adjusted. This gradual change can be dealt with by a recalibration procedure similar to that described in U.S. Pat. No. 5,844,742, entitled "Radial Self-Propagation Pattern Generation for Disk File Servowriting", issued Dec. 1, 1998, which is hereby incorporated herein by reference in its entirety.

In the recalibration procedure, writing is stopped every 40 tracks or so, the cylinder to cylinder spacing of the last few tracks is measured, and the servo reference is adjusted by a small amount to maintain a desired spacing. That is, the increasing offset distance causes the track spacing to grow, so the reference is decreased slightly to compensate. This shifts the read element backwards with respect to the propagation direction which increases the read to write offset in track number units and compensates for the increase in the physical offset distance since the preceding recalibration.

The read to write offset is used to provide an integer offset, which aids in the understanding of write to read interferences. An integer offset is defined as the difference between the written track number and the B track number. Thus, with the B track defined as above, the integer offset equals the read to write offset rounded to the nearest integer number of steps. As the propagation proceeds and reference adjustments are made, the integer offset increases by 1 every time the offset crosses a half integer value. Integer offset is further described with reference to FIG. 2.

In FIG. 2, the burst slots are assigned in succession (e.g., numerical or alphabetical order) as disclosed in the prior art, increasing by one on each step and wrapping back to zero after the last slot is used. That is, the slots are assigned or chosen in a repeating successive order modulo the number of slots (hereinafter a successive order or in succession). In the particular example depicted, A, B, and C are slots 1, 2, and 3, the integer offset is 3, and writing takes place in slot 5, so there is no interference with any of the slots being read. However, if the integer offset equaled 7, bursts would be written in slot 1, which is the A slot. In the modulo 8 arithmetic that determines slot assignment, 7 is the same as −1, so the written slot will be 1 behind the B burst which is A. More generally, interference with the A slot occurs when the integer offset equals the number of slots minus 1. The strong RF magnetic field generated by the write element unavoidably couples to the nearby read element making accurate readback impossible during write operations.

In some cases, the recovery time after switching from writing to reading can be long enough to prevent accurate readback even for the time slot following a write. In such cases, interference begins when the integer offset reaches the number of bursts minus 2. Clearly one can avoid interference by using a large enough number of slots, but this leads to time constraints as the offset gets large, since the time devoted to radial burst slots cannot be used for writing product servopatterns (e.g., region 224 of FIG. 2).

Thus, in one aspect of the present invention, a capability is provided for avoiding interference, while using a relatively small number of slots (e.g., 8 slots). This capability includes, for instance, altering the order of the written slots to avoid interference. That is, instead of choosing slots in succession to receive burst information, slots are chosen in a differing order and the servowrite process uses the variable order to write the slots.

One embodiment of the logic associated with a servowrite process using a variable order for write slots is described with reference to FIG. 3. As one example, the logic of FIG. 3 is performed and/or controlled by processor 110.

Figure 3:
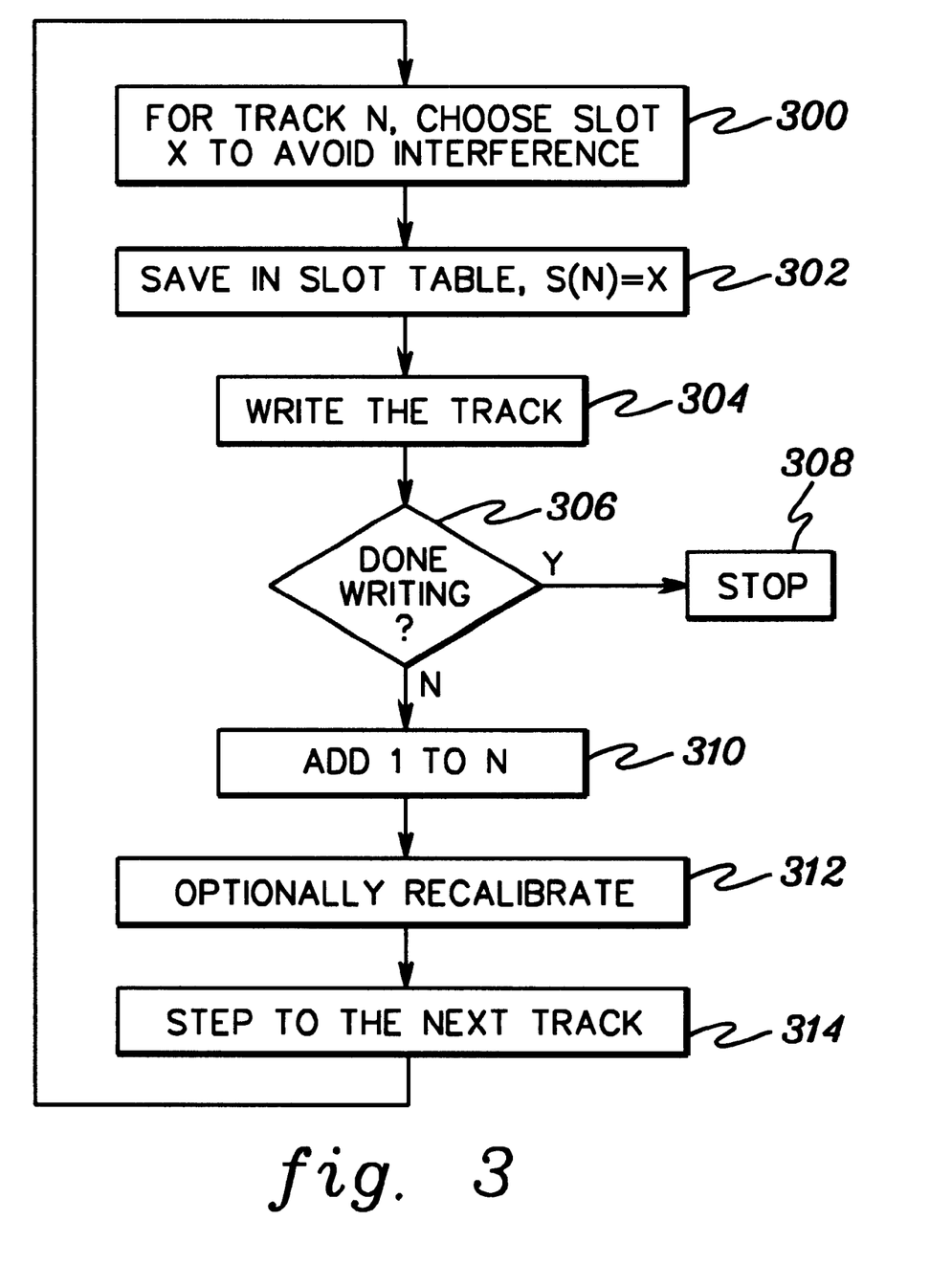
FIG. 3 depicts one embodiment of the logic associated with a servowrite process using a variable order for write slots, in accordance with an aspect of the present invention.

Referring to FIG. 3, prior to writing a particular track, a slot is chosen for that track that avoids write to read interference, STEP 300. The manner in which a slot is chosen is described in further detail below.

Subsequent to choosing the slot, the slot choice is stored in a lookup table in memory, STEP 302. In one example, the slot choice is stored at S(N), where N is the track number. This enables the servo to pick the correct A, B, and C slots. For example, for an integer offset equal to I, the slots for A, B, and C are given by S(N−I−1), S(N−I), and S(N−I+1), respectively. The above assumes that N is large enough that a negative value does not result in the equations. In order for N to be such a value, one or more tracks may have been initially written using another approach, such as a successive order approach or an approach described below with reference to FIG. 7.

After saving the slot in the table, the track is written using the chosen slot, STEP 304. For example, pattern generator 120 is used to write burst information in the chosen slot. The writing of burst information is described in the aforementioned U.S. Pat. No. 5,844,742, entitled "Radial Self-Propagation Patten Generation for Disk File Servowriting", issued on Dec. 1, 1998, which is hereby incorporated herein by reference in its entirety.

Thereafter, a determination is made as to whether the desired number of tracks have been written, INQUIRY 306. If the desired number of tracks has been written, then the process is complete, STEP 308. However, if there are more tracks to be written, then the track number is incremented by one, STEP 310.

In addition to the above, an optional recalibration step can be performed, STEP 312. In particular, recalibration is performed at convenient intervals (such as 40 steps), which results in a gradual adjustment of the servo reference to account for a varying read to write offset. Recalibration is described in the aforementioned U.S. Pat. No. 5,844,742, entitled "Radial Self-Propagation Pattern Generation for Disk File Servowriting", issued on Dec. 1, 1998.

Subsequently, the transducer is moved to the next track, STEP 314, and processing continues with STEP 300.

As described above, at STEP 300, a slot is chosen that avoids interference. On any particular step, there are many possibilities for choosing a slot to avoid interference. For example, with 8 bursts, there are 5 slots that do not interfere with A, B, and C. However, not all choices are equally desirable. One consideration is the radial spacing between written bursts within a slot (i.e., the radial distance between bursts that share the same time slot). Using the example in which the servo track spacing is one-half of the data cylinder spacing, it is clear (since this is how data tracks are usually spaced) that a spacing of 2 steps will leave only a small gap of unwritten media between the bursts. However, since the readback amplitude is to represent the fractional overlap of the read element with only a single written track, there should be enough space between bursts in a slot to prevent simultaneous detection of two tracks. This requires a gap of about one read width, and would generally be met by ensuring a minimum spacing of 3 steps. To allow for variations in read width, or in cases where the servo step size is smaller than one-half of a data cylinder, a spacing of 4 or more steps may be required.

Even accounting for spacing requirements, there are usually still several suitable slots to pick from on each step. Some choices can, however, end up leading to "dead-ends", in which no acceptable slots are available at a later step in the propagation. Therefore, it is advantageous to choose slots that avoid dead-ends.

One embodiment for choosing a slot that avoids dead-ends is described with reference to FIG. 4. In one example, the logic of FIG. 4 is performed by processor 110.

Figure 4:
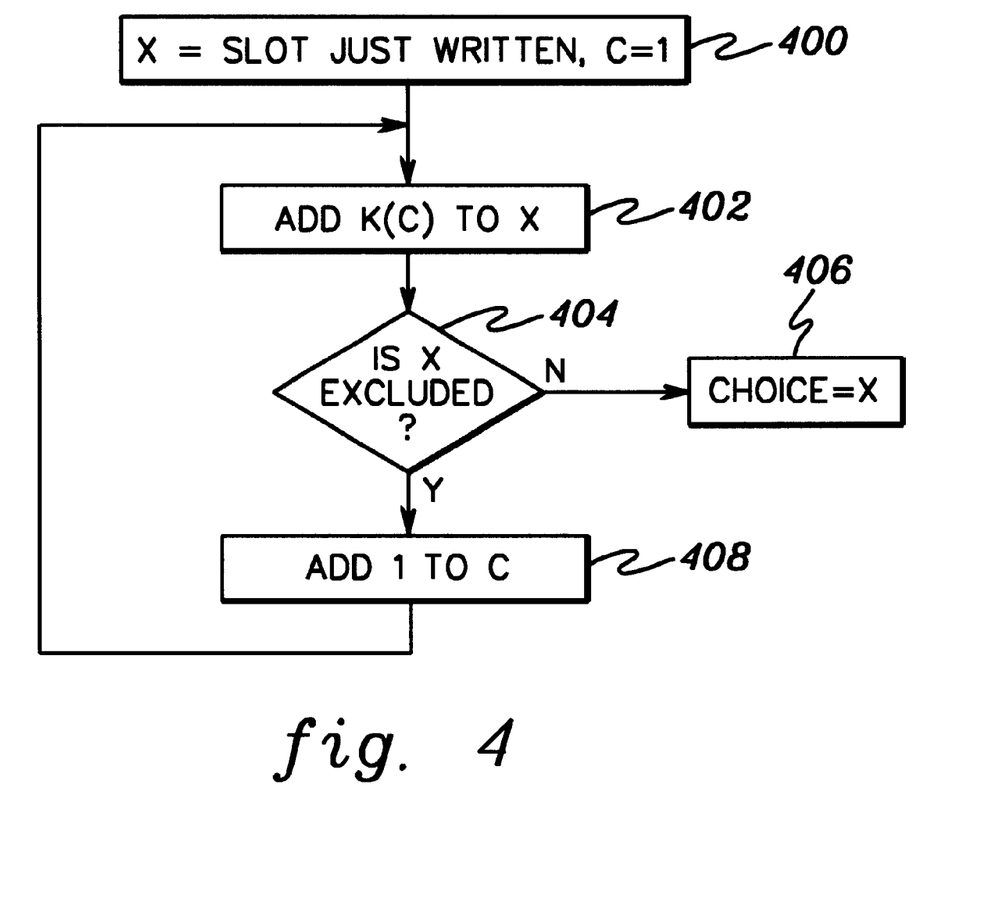
FIG. 4 depicts one embodiment of the logic associated with choosing a slot that avoids write to read interference, in accordance with an aspect of the present invention.

Referring to FIG. 4, initially, a variable X is set equal to a selected slot identifier (e.g., a number corresponding to the slot just written or an initial slot), and a variable C is set equal to one, STEP 400. Thereafter, a number stored within a vector K at K(C) (e.g., K(1)) is added to the slot number X used on the previous step, STEP 402. In one example, this number is one, which is chosen by trial and error, as explained below. Thereafter, the resulting slot number is tested to determine if it is one of the slots that is to be excluded due to write to read interference, INQUIRY 404. For example, the resulting slot number is tested against one or more rules to determine if it should be excluded. These rules may include desired spacing requirements, one or more defined exclusions, as described below, and/or other desired rules.

If the slot is not excluded, then it becomes the choice for writing, STEP 406. However, if it is excluded, then one is added to C, STEP 408, and processing continues with STEP 402. This process continues, using a predetermined set of increment values K(C) (selected, e.g., by trial and error and tested by a computer program) until a suitable choice is found. As usual, the additions are done modulo the number of available burst slots.

Figure 5:
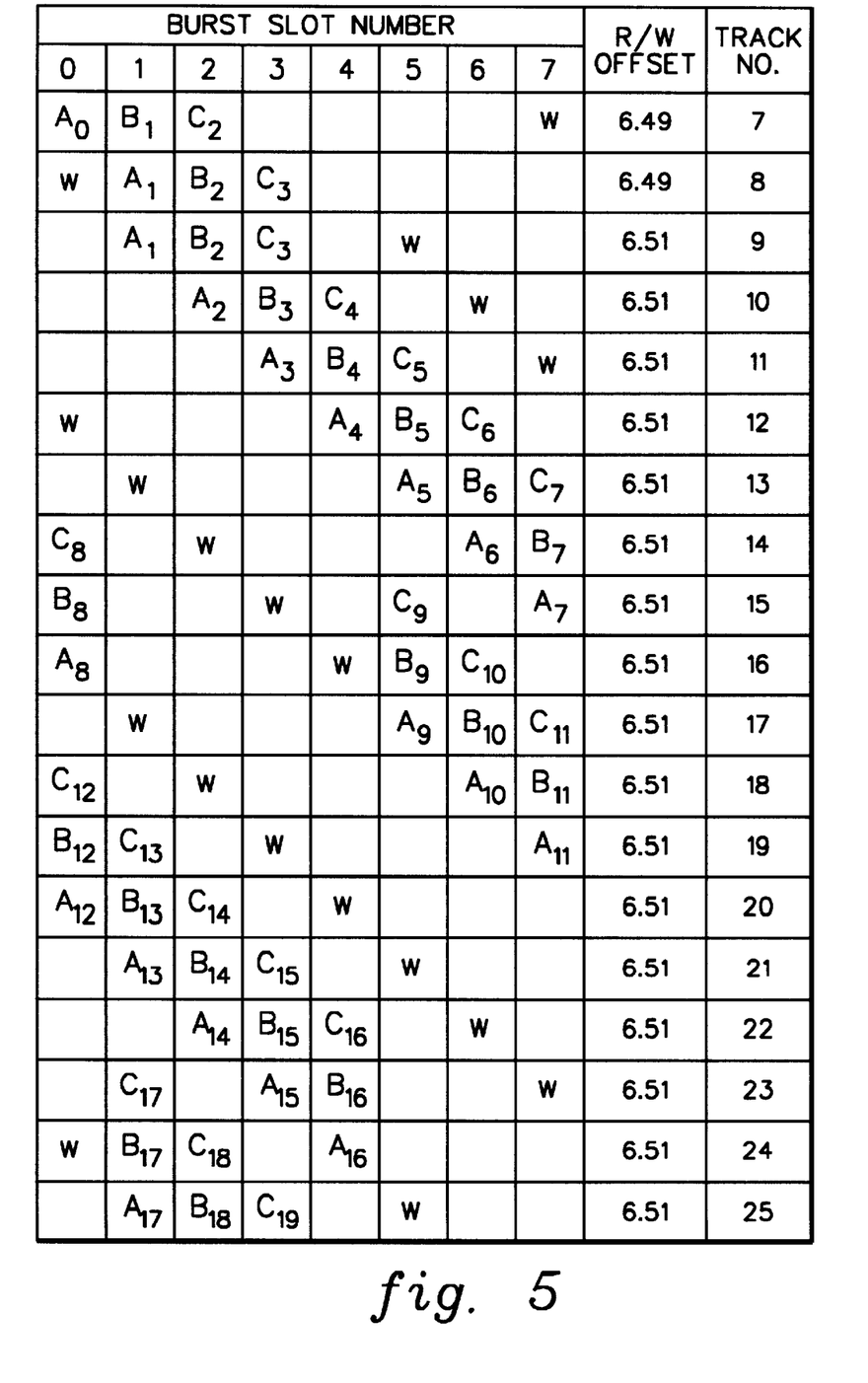
FIG. 5 depicts one embodiment of a table illustrating the reordering of write slots to avoid interference between writing and reading, in accordance with an aspect of the present invention.

Further details of this example are described with reference to FIG. 5. In particular, FIG. 5 illustrates one embodiment of the above technique that corresponds to the situation in which there are 8 burst slots and the slots to be excluded are those for A, B, and C. In this specific embodiment, a two element increment vector, K(C)=1,4, is used. The read to write offset increases as the propagation proceeds making avoidance of write to read interferences desirable. In this figure, the roles of the 8 burst slots are laid out in a grid for a propagation sequence running from top to bottom. The read bursts are shown as A, B, and C with subscripts to indicate the track number they arise from. For simplicity, the table starts with Track 7, since the slots for Tracks 0–6 are just equal to the track number. The W indicates the slot that is being written. To the right, the offset in tracks and write track number are listed.

Starting with the first row and counting back 6.49 tracks from the write track (i.e., Track No. 7), one can infer that the read element lies almost midway between Tracks 0 and 1. Since the offset is slightly less than 6.5, the read element is a little bit closer to 1, so B=Track 1 and the integer offset equals 6. Proceeding with the propagation, the write slot for Track 8 is obtained by adding 1 to the preceding one, in this case wrapping back to slot 0 due to the modulo 8 arithmetic. As in the preceding tracks with integer offset 6, no write to read interference occurs with an increment of 1, so the test passes and slot 0 is used.

Prior to writing Track 9, however, a recalibration is performed, and the reference shift causes the offset in track units to become slightly greater than 6.5, making the integer offset equal to 7. Note that the read element steps forward from a point nearly midway between 0 and 1 to a point nearly midway between 1 and 2, and the A, B, and C tracks remain the same. In this case, adding 1 gives slot 1, which fails the exclusion test because it coincides with the A burst servo slot. Adding 4 more gives slot 5 as the choice for writing Track 9. Continuing on, Tracks 10–16 can be written by simply adding 1 to the write slot on each step. At Track 17, however, the write slot "catches up" to the A slot, and the +1 rule fails the exclusion test again. As before, 4 more is added, making slot 1 the choice for Track 17. Following this, the +1 rule works for 7 more steps, then fails and 4 more is added at Step 25.

A diagram like that of FIG. 5 becomes increasingly complex as the process continues and the re-orderings of the write slots show up as widely separated slots for A, B, and C. However, using a computer program to generate slot choices for a large number of steps shows that the chosen slots eventually repeat in a pattern that is 16 steps long. Thus, the technique described above generates suitable slot choices regardless of the length of the propagation. Not only do the +1,+4 increments result in the non-interfering slot, but the spacing between tracks sharing the same slot is not smaller than 4 steps.

In this example, the integer offset changed on Track number 9 resulting in a specific repeating pattern of slots. However, this is not required for the +1,+4 increment technique to work. The switch to an integer offset of 7 could have occurred at any track. Because the initial slot order repeats every 8 tracks, there are 8 different change locations. Checking all of these with the computer program, one finds that the slots end up repeating in one of 4 distinct 16 step patterns As the propagation proceeds, the read to write offset can exceed 7.5 and the integer offset will change from 7 to 8. Using a computer to check the 16 possible switching locations for each of the 4 distinct repeat patterns, the +1,+4 technique continues to work properly and the minimum spacing between tracks in a slot remains 4. Once again, the slot choices end up repeating in one of 4 distinct 16 step patterns (the same ones as for integer offset 7). The same thing happens when the integer offset increases to 9.

For integer offsets of 10–14, the slot choices revert to the original 8 step repeating pattern involving only +1 increments. At an offset of 15, which corresponds to 7 in modulo 8 arithmetic, interference begins anew, and the +4 increments get used. This time, due to the larger offset, the repeat length becomes 32 steps instead of 16. The number of distinct patterns is 4 and the results for offsets 16 and 17 are the same as for 15.

This overall pattern of behavior continues as the offset increases. There are 3 offsets at which the both +1 and +4 increments are used, followed by 5 that have +1 only. The length of the repeating patterns increases by 16 every time the cycle repeats. This technique was checked by computer to an integer offset of 100 and all indications are that it will continue working indefinitely.

Returning to FIG. 5, the choice for Track 9 could have been slot 4 instead of 5. Therefore, another choice of increment vector to consider is K(C)=1,3. At first glance, this seems to be an even better choice because it gives a spacing of 5 steps between tracks for slot 4. Proceeding with the computer analysis as above, offsets of 7 and 8 result in a repeating pattern of slots every 64 steps with a minimum spacing of 5 steps in a slot. However, in switching to an offset of 9, the technique fails to produce a non-interfering choice. Adding more elements to the increment vector to provide checking of more slots will fix this problem, but even using K(C)=1,3,1,1,1,1,2,1 (which ends up checking every slot) leads to failure at offset 9 from having less than 3 steps between tracks in a slot.

Figure 6:
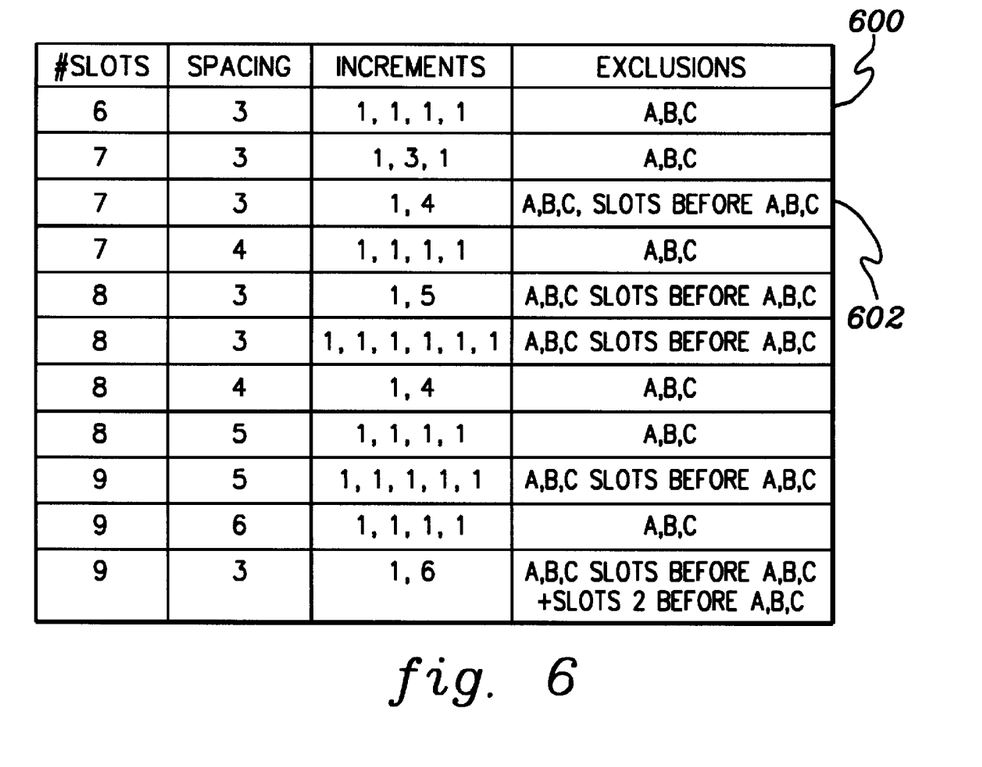
FIG. 6 depicts one example of a table of increment vectors that may be used by the logic of FIG. 4, in accordance with an aspect of the present invention.

The example above shows that only a special subset of the many possible increment vectors will work out to very large offsets. FIG. 6 provides a table with increment vectors that work well for various numbers of available slots, minimum spacings, and selected slot exclusions. For example, at reference number 600, it indicates for six slots, a minimum spacing of 3 and exclusions for A, B and C, an increment vector K(C)=1,1,1,1 is suitable. Likewise, at reference number 602, it indicates for seven slots, a minimum spacing of 3 and an exclusion of the A, B, C slots and the slots immediately preceding (in time) the A, B, C slots, an increment vector K(C)=1,4 is appropriate. This would be used, for example, if the write to read recovery of the electronics is too slow for the slot following a written slot to be accurately read. All of the increment vectors of the table have been checked out to integer offsets of more than 30, and are likely to work for indefinitely large offsets.

Described above with reference to FIGS. 4–6 is one embodiment for selecting slots to avoid write to read interference. In the example described above, for a particular track, a slot is chosen, and then, a determination is made as to whether it is excluded due to write to read interference. If it is excluded, then a new slot is chosen and checked until an appropriate slot is found.

In another embodiment, however, if the slot fails the exclusion test, then another slot, known to be acceptable, can be selected without performing another check.

The above techniques for selecting a slot can be performed for each track to receive burst information or on a subset of the tracks. As one example, burst information can be written on some of the tracks using a predefined order (e.g., a successive order), and then as propagation continues, one of the slot selection techniques can be employed. For instance, the slot selection technique can be employed, when it is determined that write to read interference is to occur or simply after writing a selected number of tracks. Thus, burst information can be written in slots chosen in one order and then that order can be varied.

Figure 7:
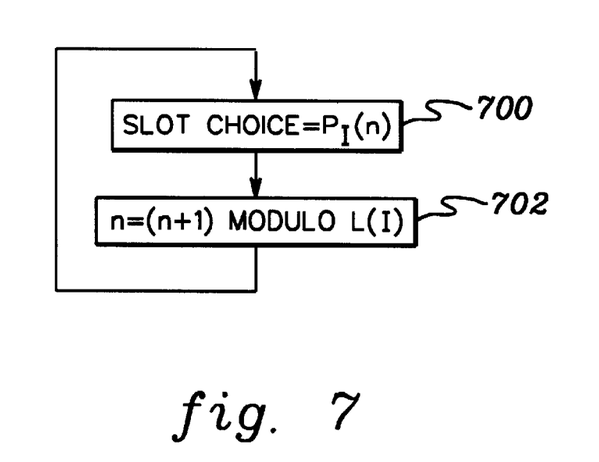
FIG. 7 depicts another embodiment of the logic associated with choosing a slot that avoids write to read interference, in accordance with an aspect of the present invention.

A further embodiment for selecting slots is illustrated in FIG. 7. The logic of FIG. 7 is performed and/or controlled by processor 110.

In this class of choosing slots, the slot choices are precomputed and stored in vectors $P_I(n)$, where n is equal to the track number, for each of the integer offsets, I, that will be encountered in a propagation. Each vector has a finite length L(I) which equals the repeat length of the pattern of slot choices for the integer offset I. Thus, at a particular track or step n, the slot choice is set equal to $P_I(n)$, STEP 700, and then the index n is incremented, STEP 702. Therefore, for each step of the propagation, a slot choice is chosen. The index n wraps back to 0 after reaching the end of the repeating pattern, as indicated by the modulo arithmetic in FIG. 7.

In one example, the success of the technique of FIG. 7 depends on being able to switch smoothly and directly from one repeating pattern to the next, even though file-to-file variations introduce large uncertainty in the track locations at which integer offset changes occur. Thus, to ensure this success, changes of servo reference arising from recalibrations are coordinated with this slot choice procedure, so that integer offset shifts only occur at predetermined values of the index n. This may be accomplished by carefully choosing the track numbers at which recalibrations are performed. Alternatively, the recalibrations can be performed at fixed intervals, but the servo reference adjustments can be postponed by appropriate numbers of steps, so as to reach the desired index values before changing. This is described further below.

Figure 8:
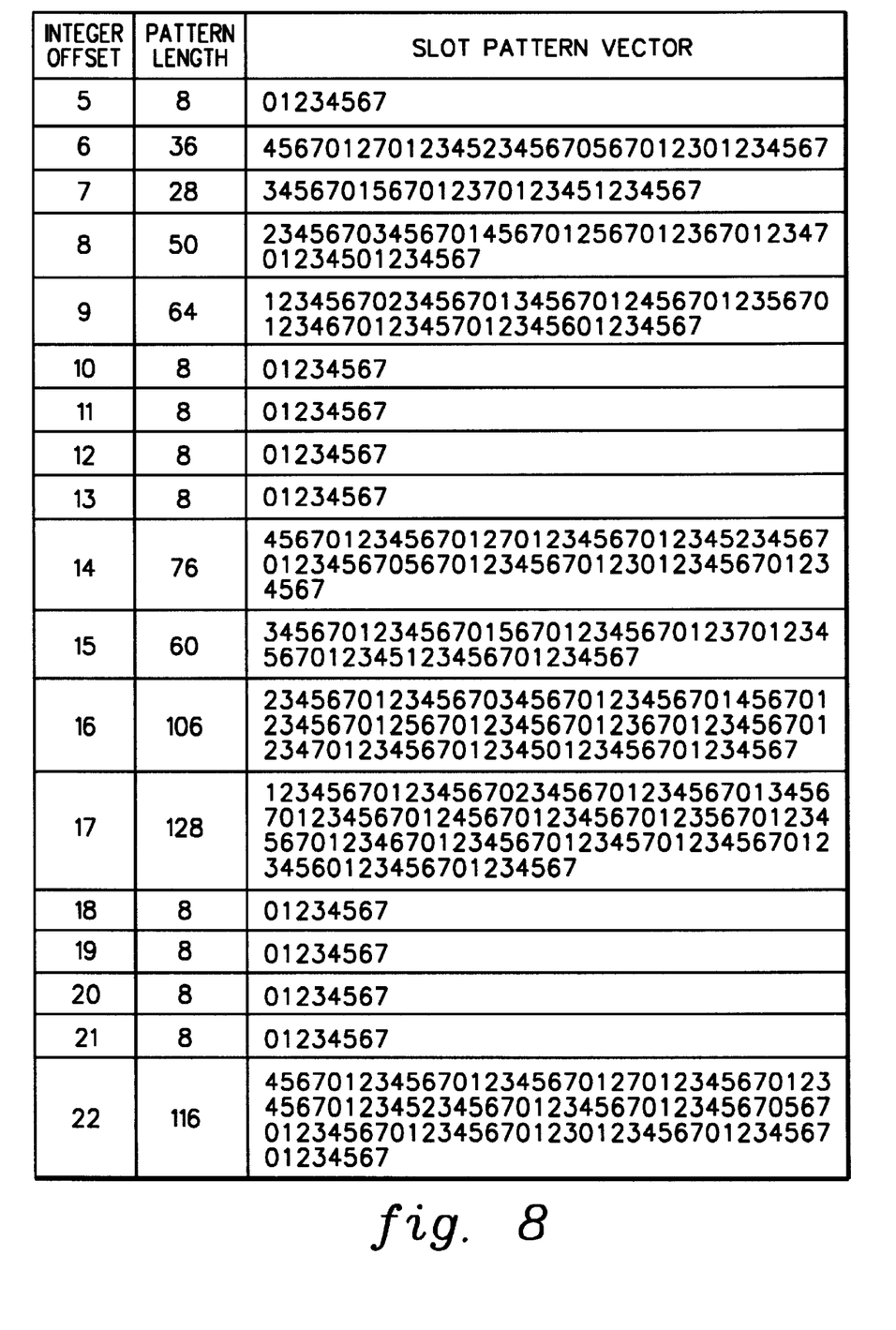
FIG. 8 depicts one example of a table giving the slot pattern vectors and their lengths for a particular embodiment of the slot choice technique depicted in FIG. 7, in accordance with an aspect of the present invention.

In a specific embodiment of this technique, the integer offset shifts are constrained to occur at an index value of 0, and the number of available slots is 8. Further, FIG. 8 depicts a table providing the slot choice pattern vectors $P_I(n)$ and lengths L(I) for offsets from 5–22. Using these values, writing is excluded from slots A, B, and C, as well as the slots preceding them. Furthermore, a minimum spacing of 4 steps is achieved. Offsets less than 5 all have the same pattern as 5.

In some cases, the integer offset at the beginning of the propagation is such that the appropriate vector of slot choices, $P_I(n)$, is different than a successive order. By using this special order during the preparation of the initial set of tracks, the propagation proceeds smoothly without the possibility of write to read interference or violation of any of the exclusions.

In some cases, the desired number of tracks may be written without an increase in integer offset. In such cases, the advantageous avoidance of write to read interference is obtained by using a predetermined slot choice order that differs from a successive order without further alteration of the predetermined order.

Described in detail above are various embodiments for choosing the order of slots to receive bursts. By enabling the choosing of a slot on a particular track, the order can advantageously be altered from a simple successive pattern. This provides a self-servowriting technique, which avoids write to read interferences. Further, it provides a technique that avoids write to read interferences with a small number of slots, and it avoids write to read interferences as propagation proceeds across the recording medium. Additionally, various aspects of the invention enable bursts to be written in each sector of the disk, during a single revolution.

As another option, multiple revolutions (e.g., two) of the disk can be used to create a track. With this option, the sectors are alternated between writes and reads. For example, reading is performed on even sectors and writing is performed on odd sectors. This has a disadvantage of being slower and taking multiple revolutions to write each track.

Although the embodiments are described with reference to a disk, the invention is equally applicable to other recording media. Further, the term track is not limited to a circumferential track. The term track is also to include, for example, a radial location on a recording medium.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of writing burst information on a recording medium having a plurality of tracks, said method comprising:

writing burst information within a plurality of slots of a first portion of tracks of said plurality of tracks, wherein said plurality of slots are chosen in a predefined order; and writing burst information within said plurality of slots of another portion of tracks of said plurality of tracks, wherein said plurality of slots are chosen using an order different than the predefined order.

2. The method of claim 1, wherein said recording medium comprises one or more sectors, and wherein said plurality of slots are within one sector of said one or more sectors.

3. The method of claim 2, wherein each sector of said one or more sectors comprises said plurality of slots.

4. The method of claim 1, wherein said predefined order is an order of succession.

5. The method of claim 1, wherein said writing is performed using a transducer comprising a write element and a separate read element, and wherein said writing burst information within slots chosen using a different order avoids a write to read interference resulting from the separate write and read elements.

6. The method of claim 1, further comprising choosing for a track of said another portion of tracks a slot of said plurality of slots to be used to receive burst information.

7. The method of claim 6, wherein said choosing comprises selecting the slot that satisfies one or more criteria.

8. The method of claim 7, wherein said one or more criteria include a minimum spacing requirement.

9. The method of claim 7, wherein said one or more criteria include avoiding a predefined exclusion of one or more slots.

10. The method of claim 9, wherein said writing is performed using a transducer comprising a write element and a separate read element, and wherein the predefined exclusion comprises an exclusion of a slot closest to a center of the read element (a B slot), a slot written one step before the B slot, and a slot written one step after the B slot.

11. The method of claim 6, wherein said choosing comprises:
   adding a value to a selected slot identifier to obtain a new slot;
   determining whether the new slot is excluded; and
   selecting another slot, when the new slot is excluded.

12. The method of claim 11, wherein said determining comprises checking whether the new slot satisfies one or more criteria, said one or more criteria comprising at least one of:
   a minimum spacing requirement; and
   avoiding a predefined exclusion of one or more slots.

13. The method of claim 11, wherein said selecting another slot comprises repeating the adding and determining, wherein the value to be added can be a same or different value from the value previously added.

14. The method of claim 11, wherein said selecting another slot comprises choosing an acceptable slot.

15. The method of claim 11, wherein the selected slot identifier corresponds to the last slot written or an initial slot.

16. The method of claim 6, wherein said choosing comprises selecting the slot from a plurality of precomputed slot choices.

17. The method of claim 1, further comprising choosing for each track of the another portion of tracks a slot of said plurality of slots to receive the burst information.

18. A method of writing burst information on a recording medium having a plurality of tracks, said method comprising:
   selecting a slot of a track of said plurality of tracks to receive burst information, said selecting being unconcerned with a particular order for selecting slots; and
   writing burst information within said selected slot.

19. The method of claim 18, further comprising repeating said selecting and said writing for one or more other tracks of said plurality of tracks.

20. The method of claim 18, wherein said particular order for selecting slots comprises a successive order.

21. The method of claim 18, wherein said writing is performed using a transducer comprising a write element and a separate read element, and wherein said selecting avoids a write to read interference resulting from the separate write and read element.

22. The method of claim 18, wherein said selecting comprises:
   adding a value to a selected slot identifier to obtain a new slot;
   determining whether the new slot is excluded; and
   selecting another slot, when the new slot is excluded.

23. The method of claim 22, wherein said determining comprises checking whether the new slot satisfies one or more criteria, said one or more criteria comprising at least one of:
   a minimum spacing requirement; and
   avoiding a predefined exclusion of one or more slots.

24. The method of claim 22, wherein said selecting another slot comprises repeating the adding and determining, wherein the value to be added can be a same or different value from the value previously added.

25. The method of claim 22, wherein said selecting another slot comprises choosing an acceptable slot.

26. The method of claim 22, wherein the selected slot identifier corresponds to the last slot written or an initial slot.

27. The method of claim 18, wherein said selecting comprises selecting the slot from a plurality of precomputed slot choices.

28. A method of writing burst information on a recording medium having a plurality of tracks, said method comprising:
   writing burst information within one or more slots of one or more tracks of said plurality of tracks;
   determining that if burst information is to be written in a slot of another track of said plurality of tracks that a write to read interference will occur; and
   selecting, in response to said determining, another slot of said another track to write said burst information.

29. The method of claim 28, wherein said one or more slots are chosen in a particular order, and wherein said another slot is not of the particular order.

30. The method of claim 28, wherein each of said one or more slots and said another slot is chosen for its corresponding track independent of any particular order.

31. A method of writing burst information on a recording medium having a plurality of tracks, said method comprising:
   writing burst information within one slot of a track of said plurality of tracks; and
   writing burst information within another slot of a next track of said plurality of tracks, wherein said another slot is not in successive order of said one slot.

32. The method of claim 31, further comprising choosing said another slot, said choosing using a predefined order other than a successive order.

33. A system of writing burst information on a recording medium having a plurality of tracks, said system comprising:
   means for writing burst information within a plurality of slots of a first portion of tracks of said plurality of tracks, wherein said plurality of slots are chosen in a predefined order; and means for writing burst information within said plurality of slots of another portion of tracks of said plurality of tracks, wherein said plurality of slots are chosen using an order different than the predefined order.

34. The system of claim 33, wherein said recording medium comprises one or more sectors, and wherein said plurality of slots are within one sector of said one or more sectors.

35. The system of claim 34, wherein each sector of said one or more sectors comprises said plurality of slots.

36. The system of claim 33, wherein said predefined order is an order of succession.

37. The system of claim 33, wherein said means for writing comprises a transducer including a write element and a separate read element, and wherein said plurality of slots are chosen using a different order to avoid a write to read interference resulting from the separate write and read elements.

38. The system of claim 33, further comprising means for choosing for a track of said another portion of tracks a slot of said plurality of slots to be used to receive burst information.

39. The system of claim 38, wherein said means for choosing comprises means for selecting the slot that satisfies one or more criteria.

40. The system of claim 39, wherein said one or more criteria include a minimum spacing requirement.

41. The system of claim 39, wherein said one or more criteria include avoiding a predefined exclusion of one or more slots.

42. The system of claim 41, wherein said means for writing comprises a transducer including a write element and a separate read element, and wherein the predefined exclusion comprises an exclusion of a slot closest to a center of the read element (a B slot), a slot written one step before the B slot, and a slot written one step after the B slot.

43. The system of claim 38, wherein said means for choosing comprises:

means for adding a value to a selected slot identifier to obtain a new slot;

means for determining whether the new slot is excluded; and means for selecting another slot, when the new slot is excluded.

44. The system of claim 43, wherein said means for determining comprises means for checking whether the new slot satisfies one or more criteria, said one or more criteria comprising at least one of:

a minimum spacing requirement; and avoiding a predefined exclusion of one or more slots.

45. The system of claim 43, wherein said means for selecting another slot comprises means for repeating the adding and determining, wherein the value to be added can be a same or different value from the value previously added.

46. The system of claim 43, wherein said means for selecting another slot comprises means for choosing an acceptable slot.

47. The system of claim 43, wherein the selected slot identifier corresponds to the last slot written or an initial slot.

48. The system of claim 38, wherein said means for choosing comprises means for selecting the slot from a plurality of precomputed slot choices.

49. The system of claim 33, further comprising means for choosing for each track of the another portion of tracks a slot of said plurality of slots to receive the burst information.

50. A system of writing burst information on a recording medium having a plurality of tracks, said system comprising:

means for selecting a slot of a track of said plurality of tracks to receive burst information, said selecting being unconcerned with a particular order for selecting slots; and means for writing burst information within said selected slot.

51. The system of claim 50, further comprising means for repeating said selecting and said writing for one or more other tracks of said plurality of tracks.

52. The system of claim 50, wherein said particular order for selecting slots comprises a successive order.

53. The system of claim 50, wherein said means for writing comprises a transducer including a write element and a separate read element, and wherein said means for selecting avoids a write to read interference resulting from the separate write and read element.

54. The system of claim 50, wherein said means for selecting comprises:

means for adding a value to a selected slot identifier to obtain a new slot;

means for determining whether the new slot is excluded; and means for selecting another slot, when the new slot is excluded.

55. The system of claim 54, wherein said means for determining comprises means for checking whether the new slot satisfies one or more criteria, said one or more criteria comprising at least one of:

a minimum spacing requirement; and avoiding a predefined exclusion of one or more slots.

56. The system of claim 54, wherein said means for selecting another slot comprises means for repeating the adding and determining, wherein the value to be added can be a same or different value from the value previously added.

57. The system of claim 54, wherein said means for selecting another slot comprises means for choosing an acceptable slot.

58. The system of claim 54, wherein the selected slot identifier corresponds to the last slot written or an initial slot.

59. The system of claim 50, wherein said means for selecting comprises means for selecting the slot from a plurality of precomputed slot choices.

60. A system of writing burst information on a recording medium having a plurality of tracks, said system comprising:

means for writing burst information within one or more slots of one or more tracks of said plurality of tracks;

means for determining that if burst information is to be written in a slot of another track of said plurality of tracks that a write to read interference will occur; and means for selecting, in response to the determining, another slot of said another track to write said burst information.

61. The system of claim 60, wherein said one or more slots are chosen in a particular order, and wherein said another slot is not of the particular order.

62. The system of claim 60, wherein each of said one or more slots and said another slot is chosen for its corresponding track independent of any particular order.

63. A system of writing burst information on a recording medium having a plurality of tracks, said system comprising:

means for writing burst information within one slot of a track of said plurality of tracks; and means for writing burst information within another slot of a next track of said plurality of tracks, wherein said another slot is not in successive order of said one slot.

64. The system of claim 63, further comprising means for choosing said another slot, said choosing using a predefined order other than a successive order.

65. A recording medium comprising a plurality of tracks to receive burst information, said recording medium comprising:

a first portion of tracks of said plurality of tracks comprising a plurality of slots to receive burst information, wherein said plurality of slots are chosen in a predefined order; and another portion of tracks of said plurality of tracks comprising said plurality of slots to receive burst information, wherein said plurality of slots of said another portion are chosen using an order different than the predefined order.

66. A system of writing burst information on a recording medium having a plurality of tracks, said system comprising:

a processor to select a slot of a track of said plurality of tracks to receive burst information, the selecting being unconcerned with a particular order for selecting slots; and at least a transducer coupled to said processor to write burst information within said selected slot.

67. A system of writing burst information on a recording medium having a plurality of tracks, said system comprising:

at least a transducer to write burst information within one or more slots of one or more tracks of said plurality of tracks; and a processor coupled to said transducer to determine whether the writing of burst information in a slot of another track of said plurality of tracks will cause a write to read interference, wherein another slot of said another track is selected to receive said burst information, if said write to read interference will result.

68. A system of writing burst information on a recording medium having a plurality of tracks, said system comprising:

one or more components to write burst information within one slot of a track of said plurality of tracks; and one or more components to write burst information within another slot of a next track of said plurality of tracks, wherein said another slot is not in successive order of said one slot.

69. At least one program storage device readable by a machine, tangibly embodying at least one program of instructions executable by the machine to perform a method of writing burst information on a recording medium having a plurality of tracks, said method comprising:

writing burst information within a plurality of slots of a first portion of tracks of said plurality of tracks, wherein said plurality of slots are chosen in a predefined order; and writing burst information within said plurality of slots of another portion of tracks of said plurality of tracks, wherein said plurality of slots are chosen using an order different than the predefined order.

70. The at least one program storage device of claim 69, wherein said predefined order is an order of succession.

71. The at least one program storage device of claim 69, wherein said at least one program of instructions controls at least a transducer to perform the writing, said transducer comprising a write element and a separate read element, and wherein said writing burst information within slots chosen using a different order avoids a write to read interference resulting from the separate write and read elements.

72. The at least one program storage device of claim 69, wherein said method further comprises choosing for a track of said another portion of tracks a slot of said plurality of slots to be used to receive burst information.

73. The at least one program storage device of claim 72, wherein said choosing comprises selecting the slot that satisfies one or more criteria.

74. The at least one program storage device of claim 73, wherein said one or more criteria include a minimum spacing requirement.

75. The at least one program storage device of claim 73, wherein said one or more criteria include avoiding a predefined exclusion of one or more slots.

76. The at least one program storage device of claim 75, wherein said at least one program of instructions controls at least a transducer to perform the writing, said transducer comprising a write element and a separate read element, and wherein the predefined exclusion comprises an exclusion of a slot closest to a center of the read element (a B slot), a slot written one step before the B slot, and a slot written one step after the B slot.

77. The at least one program storage device of claim 72, wherein said choosing comprises:

adding a value to a selected slot identifier to obtain a new slot;

determining whether the new slot is excluded; and selecting another slot, when the new slot is excluded.

78. The at least one program storage device of claim 77, wherein said determining comprises checking whether the new slot satisfies one or more criteria, said one or more criteria comprising at least one of:

a minimum spacing requirement; and avoiding a predefined exclusion of one or more slots.

79. The at least one program storage device of claim 77, wherein said selecting another slot comprises repeating the adding and determining, wherein the value to be added can be a same or different value from the value previously added.

80. The at least one program storage device of claim 77, wherein said selecting another slot comprises choosing an acceptable slot.

81. The at least one program storage device of claim 77, wherein the selected slot identifier corresponds to the last slot written or an initial slot.

82. The at least one program storage device of claim 72, wherein said choosing comprises selecting the slot from a plurality of precomputed slot choices.

83. The at least one program storage device of claim 69, wherein said method further comprises choosing for each track of the another portion of tracks a slot of said plurality of slots to receive the burst information.

84. At least one program storage device readable by a machine, tangibly embodying at least one program of instructions executable by the machine to perform a method of writing burst information on a recording medium having a plurality of tracks, said method comprising:

selecting a slot of a track of said plurality of tracks to receive burst information, said selecting being unconcerned with a particular order for selecting slots; and writing burst information within said selected slot.

85. The at least one program storage device of claim 84, wherein said method further comprises repeating said selecting and said writing for one or more other tracks of said plurality of tracks.

86. The at least one program storage device of claim 84, wherein said particular order for selecting slots comprises a successive order.

87. The at least one program storage device of claim 84, wherein said at least one program of instructions controls at least a transducer to perform the writing, said transducer comprising a write element and a separate read element, and wherein said selecting avoids a write to read interference resulting from the separate write and read element.

88. The at least one program storage device of claim 84, wherein said selecting comprises:

adding a value to a selected slot identifier to obtain a new slot;

determining whether the new slot is excluded; and selecting another slot, when the new slot is excluded.

89. The at least one program storage device of claim 88, wherein said determining comprises checking whether the new slot satisfies one or more criteria, said one or more criteria comprising at least one of:

a minimum spacing requirement; and avoiding a predefined exclusion of one or more slots.

90. The at least one program storage device of claim 88, wherein said selecting another slot comprises repeating the adding and determining, wherein the value to be added can be a same or different value from the value previously added.

91. The at least one program storage device of claim 88, wherein said selecting another slot comprises choosing an acceptable slot.

92. The at least one program storage device of claim 88, wherein the selected slot identifier corresponds to the last slot written or an initial slot.

93. The at least one program storage device of claim 84, wherein said selecting comprises selecting the slot from a plurality of precomputed slot choices.

94. At least one program storage device readable by a machine, tangibly embodying at least one program of instructions executable by the machine to perform a method of selecting slots to write burst information on a recording medium having a plurality of tracks, said method comprising:

determining that if burst information is to be written in a slot of a track of said plurality of tracks that a write to read interference will occur; and selecting, in response to said determining, another slot of said track to write said burst information.

95. The at least one program storage device of claim 94, further comprising writing burst information within one or more slots of one or more other tracks of said plurality of tracks, and wherein said one or more slots are chosen in a particular order, and wherein said another slot is not of the particular order.

96. The at least one program storage device of claim 94, further comprising writing burst information within one or more slots of one or more other tracks of said plurality of tracks, and wherein each of said one or more slots and said another slot is chosen for its corresponding track independent of any particular order.

97. At least one program storage device readable by a machine, tangibly embodying at least one program of instructions executable by the machine to perform a method of selecting slots to write burst information on a recording medium having a plurality of tracks, said method comprising:

selecting one slot of a track of said plurality of tracks to write burst information therein; and selecting another slot of a next track of said plurality of tracks to write burst information therein, wherein said another slot is not in successive order of said one slot.

98. The at least one program storage device of claim 97, wherein said selecting said another slot comprises using a predefined order other than a successive order.

\* \* \* \* \*